US012620571B2

(12) United States Patent
Kim et al.

(10) Patent No.: US 12,620,571 B2
(45) Date of Patent: May 5, 2026

(54) MULTI-LAYERED ELECTRODE FOR BATTERY AND FABRICATION METHOD THEREOF

(71) Applicant: SK On Co., Ltd., Seoul (KR)

(72) Inventors: Min Hwan Kim, Daejeon (KR); Dong Hoon Lee, Daejeon (KR)

(73) Assignee: SK On Co., Ltd., Seoul (KR)

( * ) Notice: Subject to any disclaimer, the term of this patent is extended or adjusted under 35 U.S.C. 154(b) by 789 days.

(21) Appl. No.: 17/748,133

(22) Filed: May 19, 2022

(65) Prior Publication Data

US 2023/0097017 A1 Mar. 30, 2023

(30) Foreign Application Priority Data

Sep. 28, 2021 (KR) ........................ 10-2021-0127849

(51) Int. Cl.
*H01M 4/04* (2006.01)
*H01M 4/62* (2006.01)

(52) U.S. Cl.
CPC ......... *H01M 4/0404* (2013.01); *H01M 4/621* (2013.01)

(58) Field of Classification Search
CPC .... H01M 4/04; H01M 4/0402; H01M 4/0404; H01M 4/621; H01M 4/13; H01M 4/02
See application file for complete search history.

(56) References Cited

U.S. PATENT DOCUMENTS

| | | | | |
|---|---|---|---|---|
| 10,586,975 B2 | 3/2020 | Ko et al. | | |
| 10,763,508 B2 | 9/2020 | Song et al. | | |
| 11,189,824 B2 * | 11/2021 | Ebner | ................. | H01M 4/0409 |
| 2004/0131889 A1 * | 7/2004 | Leddy | ................... | H01M 4/366 |
| | | | | 428/692.1 |
| 2013/0255074 A1 * | 10/2013 | Uchida | ............... | H01M 4/0404 |
| | | | | 29/623.5 |
| 2014/0349189 A1 | 11/2014 | Takahata et al. | | |
| 2017/0173893 A1 * | 6/2017 | Li | ......................... | H01M 4/505 |
| 2018/0151883 A1 * | 5/2018 | Song | .................... | H01M 4/621 |
| 2020/0052348 A1 * | 2/2020 | Oura | .................... | H01M 4/625 |

FOREIGN PATENT DOCUMENTS

| | | | |
|---|---|---|---|
| JP | 2003123742 A | 4/2003 | |
| JP | 2003197189 A | 7/2003 | |
| JP | 2012174401 A | 9/2012 | |
| KR | 10-2015-0050075 A | 5/2015 | |
| KR | 1020170025812 A | 3/2017 | |
| KR | 1020170090720 A | 8/2017 | |

(Continued)

OTHER PUBLICATIONS

Doganay et al. Effect of external magnetic field on thermal conductivity and viscosity of magnetic nanofluids: a review. Materials Research Express. 6, 112003 (Year: 2019).*

(Continued)

*Primary Examiner* — Marla D Mcconnell
*Assistant Examiner* — Julia S Caserto
(74) *Attorney, Agent, or Firm* — The Webb Law Firm

(57) ABSTRACT

A fabrication method of a multi-layered electrode for a battery includes (a) applying a binder solution including magnetic particles on a current collector, (b) applying a magnetic field to the current collector to which the binder solution is applied, and (c) applying an electrode slurry including an electrode active material on the binder solution.

11 Claims, 3 Drawing Sheets

Magnetic field ON

Reversible

Magnetic field OFF

(56)                References Cited

FOREIGN PATENT DOCUMENTS

| KR | 10-2018-0027258 | A | 3/2018 |
| KR | 1020180036631 | A | 4/2018 |
| KR | 10-1944320 | B1 | 2/2019 |

OTHER PUBLICATIONS

Hassan et al. Water Solubility Characteristics of Poly(vinyl alcohol) and Gels Prepared by Freezing/Thawing Processes. Water Soluble Polymers. Springer, Boston, MA. p. 31-40 (Year: 2002).*
Thurm, S. and Odenback, S. Particle size distribution as key parameter for the flow behavior of ferrofluids. Physics of Fluids. 15, 1658-1664 (Year: 2003).*
Zhang, L. et al. Magnetic Field Regulating the Graphite Electrode for Excellent Lithium-Ion Batteries Performance. ACS Sustainable Chemistry & Engineering. 7, 6152-6160 (Year: 2019).*
Zuin, A. et al. Anisotropic magnetic carbon materials based on graphite and magnetite nanoparticles. Carbon. 77, 600-606 (Year: 2014).*

* cited by examiner

Magnetic field ON                Magnetic field OFF

MULTI-LAYERED ELECTRODE FOR BATTERY AND FABRICATION METHOD THEREOF

CROSS-REFERENCE TO RELATED APPLICATION

This application claims priority to Korean Patent Application No. 10-2021-0127849 filed Sep. 28, 2021, the disclosure of which is hereby incorporated by reference in its entirety.

BACKGROUND OF THE INVENTION

Field of the Invention

The following disclosure relates to a multi-layered electrode for a battery and a fabrication method thereof.

Description of Related Art

Recently, in line with growing demand for electronic devices such as mobile devices, the development of weight reduction and miniaturization of electrochemical batteries (secondary batteries) to increase portability of electronic devices has expanded. In addition to this trend, regulations on fuel efficiency and exhaust gas have been strengthened worldwide, so the growth of the electric vehicle (EV) market has accelerated and the development of a high-power, large-capacity battery for use in electric vehicles is required.

In order to improve battery quality and performance, binders having high adhesion have been developed and a technology for lowering the content of binders has been developed, but there is a limit in types of binders having high adhesion and to lowering a binder content, and a serious problem may occur in that an electrode mixture layer is detached from the current collector during the process or charging/discharging process, and if the binder content is too low, a serious problem may occur in that an electrode composition layer is detached from a current collector during a notching process or the charging/discharging process.

Therefore, a technology for efficiently distributing a binder inside an electrode has been developed. In this case, the binder content is formed to be higher at an interface of a current collector, thereby suppressing detachment, while lowering the binder content in the electrode mixture layer and a surface, to improve battery performance. To this end, a technology for forming a binder solution or electrode slurry having a high binder content in a lower layer and forming an electrode slurry having a low binder content in an upper layer, as a dual-layer, has been developed, but it may be difficult to maintain a uniform distribution of the binder in the lower layer, and a lower part liquid is pushed due to a high discharge pressure during coating of a supernatant liquid, which leads to a reduction in adhesion between the current collector-electrode mixture layer.

Accordingly, it is necessary to develop a secondary battery with improved fast charging performance by solving the aforementioned problems and improving adhesion between the current collector-electrode mixture layer by optimizing the binder distribution in the electrode.

SUMMARY OF THE INVENTION

An embodiment of the present invention is directed to solving a problem arising as solid content in a lower binder solution are not maintained in a uniform distribution when electrode slurry is applied to an upper part of a binder solution during a process of forming an electrode active material layer by applying the binder solution and the electrode slurry onto a current collector, that is a problem of a degradation of adhesion between the current collector and the electrode active material layer.

In one general aspect, a fabrication method of a multi-layered electrode for a battery includes: (a) applying a binder solution including magnetic particles on a current collector; (b) applying a magnetic field to the current collector to which the binder solution is applied; and (c) applying an electrode slurry including an electrode active material on the binder solution.

A content of solid content in the binder solution may be 0.5 to 50 wt %.

Viscosity of the binder solution in step (a) may be 500 cp or less.

A weight ratio of the magnetic particles and the binder in the binder solution may be 1:20 to 1:80.

A content of the magnetic particles in the binder solution may be 0.1 to 5 wt %.

The magnetic particles may include at least one selected from the group consisting of iron (Fe), nickel (Ni), and cobalt (Co).

The binder may be a water-soluble binder.

Step (b) may be applying a magnetic field in a direction perpendicular to the current collector.

The magnetic field applied in step (b) may be a unidirectional magnetic field formed by a magnetic device positioned above and below the current collector.

A strength of the magnetic field may be 100 to 5000 G, and a magnetic field application time may be 1 second to 60 seconds.

Viscosity of the binder solution before and after the application of the magnetic field may satisfy Relational Expression 1 below.

$$1.2 < A_2/A_1 < 5 \qquad \text{[Relational Expression 1]}$$

In Relational Expression 1, $A_1$ is a viscosity of the binder solution before the magnetic field is applied, and $A_2$ is a viscosity of the binder solution when the electrode slurry is applied after the magnetic field is applied.

The method may further include (d) performing drying, after step (c), wherein the viscosity of the binder solution during drying may be 100 to 5000 cp.

In another general aspect, a multi-layered electrode for a secondary battery, including a current collector; and an electrode active material layer containing magnetic particles and a binder formed on the current collector, wherein a difference between a maximum loading value and a minimum loading value of the electrode active material layer in at least five positions at regular intervals in a width direction may be 10% or less of a total loading average value.

The multi-layered electrode may satisfy Relational Expression 2 below.

$$0.2 < B_2/B_1 < 0.8 \qquad \text{[Relational Expression 2]}$$

In Relational Expression 2, $B_1$ is a weight of the binder in the entire electrode active material layer, and $B_2$ is a weight of the binder in a region of 15% of a total thickness of the electrode active material layer from the current collector.

Adhesion of the electrode active material layer with respect to the current collector may be 0.2N/cm or more.

The multi-layered electrode may satisfy Relational Expression 3 below.

$$-30\% \le (C-D)/D \le +30\% \qquad \text{[Relational Expression 3]}$$

In Relational Expression 3, C is an interfacial adhesion between the current collector and the electrode active material layer measured at a certain position selected in a width direction of the electrode active material layer, and D is an average value of the interfacial adhesion between the current collector and the electrode active material layer.

In another general aspect, a secondary battery includes a multi-layered electrode; a separator; and an electrolyte.

Other features and aspects will be apparent from the following detailed description, the drawings, and the claims.

DESCRIPTION OF THE INVENTION

Figure 1:
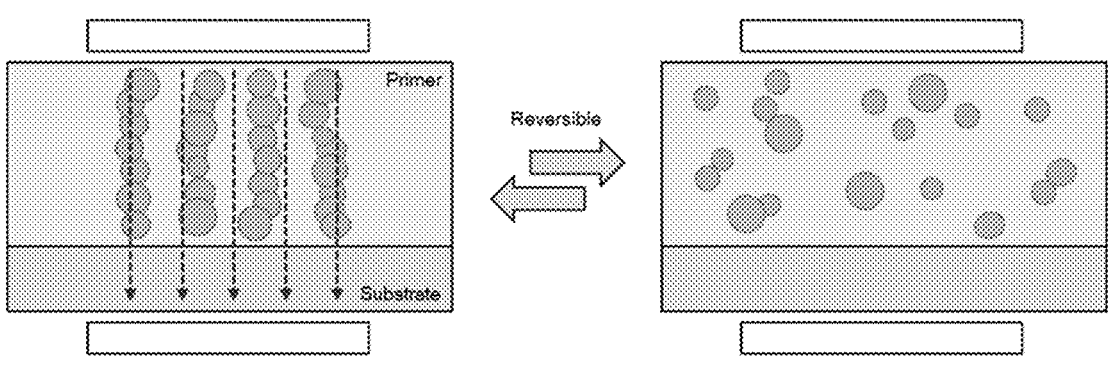
FIG. 1 is a view illustrating a change in array of solid particles in a binder solution when a magnetic field is applied according to an embodiment of the present invention.

Advantages and features of the present invention and methods of accomplishing the same will be apparent by referring to embodiments described below in detail in connection with the accompanying drawings. However, the present invention is not limited to the embodiments disclosed below and may be implemented in various different forms. The embodiments are provided only for completing the disclosure of the present invention and for fully representing the scope of the present invention to those skilled in the art. Embodiments of the present invention will be described in detail with reference to the accompanying drawings. Irrespective of the drawings, like reference numbers refer to like elements, and "and/or" includes each and every combination of one or more of the recited items.

Unless otherwise defined, all the terms (including technical and scientific terms) used herein have the same meaning as commonly understood by a person skilled in the art to which this invention pertains. Unless explicitly described to the contrary, a singular form includes a plural form in the present specification. Throughout the specification, unless explicitly described to the contrary, the word "comprise" and variations such as "comprises" or "comprising", will be understood to imply the inclusion of stated elements but not the exclusion of any other elements.

It will be understood that when an element such as a layer, film, region, or substrate is referred to as being "on" another element, it may be directly on the other element or intervening elements may also be present.

In the present specification, "viscosity" is a value measured at a shear rate of $1 \ s^{-1}$ using a Brookfield rotational viscometer at room temperature and pressure conditions, and tolerance is ±100 cP.

The present invention provides a fabrication method of a multi-layered electrode for a battery including: (a) applying a binder solution including magnetic particles on a current collector; (b) applying a magnetic field to the current collector to which the binder solution is applied; and (c) applying an electrode slurry including an electrode active material on the binder solution.

(a1) First, a binder solution including magnetic particles, a binder, and a solvent is prepared. The binder solution refers to a mixture in which the binder is not dissolved and exists in the form of particles in a solvent, and a thickener, a conductive material, etc. may be additionally mixed and used as necessary. In this case, a solid content in the binder solution excluding the solvent may be included in an amount of 0.5 to 50 wt %, specifically 10 to 40 wt %. In terms of uniformly applying the binder solution on the current collector, viscosity of the binder solution may be 500 cp or less, specifically, 100 to 500 cp.

The binder may be a water-soluble binder, and specifically, styrene-butadiene rubber, acrylated styrene-butadiene rubber, polyvinyl alcohol, sodium polyacrylate, propylene, and an olefin copolymer having 2 to 8 carbon atoms, a copolymer of (meth)acrylic acid and (meth)acrylic acid alkyl ester, or a combination thereof.

The binder solution may include 0.1 to 50 wt % of the binder, preferably, 10 to 30 wt %, based on a total weight. In the present invention, by distributing a plurality of binders at an interface between the current collector and the electrode active material layer and reducing a binder content on the electrode surface side, the total amount of binder included in the entire active material layer may be significantly reduced. Accordingly, interfacial adhesion between the current collector and the electrode active material layer may be improved and fast charging performance may also be improved.

The magnetic particles may include at least one selected from the group consisting of iron (Fe), nickel (Ni), and cobalt (Co) having a particle size of 50 nm to 5 μm. By magnetic force generated when a magnetic field is applied, the magnetic particles may form an aggregate with the solid particles in the binder solution and the aggregate may form a chain structure in the solution to increase the viscosity of the binder solution. Accordingly, the fabrication method of a multi-layered electrode for a secondary battery according to the present invention may suppress a non-uniform distribution of the solid content, particularly the binder, in a lower binder solution that occurs during a subsequent application of an upper electrode slurry.

According to an aspect of the present invention, the magnetic particles may exist in a state of being coated on a conductive material. A coating method is not particularly limited, but a solution method may be used as a non-limiting example. Specifically, 0.5 to 20 parts by weight of the magnetic particles, preferably, 1 to 10 parts by weight, may be included with respect to 100 parts by weight of the conductive material.

The conductive material is used to impart conductivity to the electrode, and is not particularly limited as long as a material is a conventional electronically conductive material that does not cause chemical change in the battery. For example, natural graphite, artificial graphite, carbon black, acetylene black, ketjen black, carbon fibers, carbon nanotubes, and combinations thereof may be used, but is not limited thereto.

In terms of efficient formation of aggregates of the magnetic particles and the solid content in the binder solution, a weight ratio of the magnetic particles and the binder in the binder solution may be 1:20 to 1:80, preferably, 1:40 to 1:80. More specifically, the content of the magnetic particles in the binder solution may be 0.1 to 5 wt %, preferably, 0.1 to 1 wt %.

The solvent may be at least one selected from the group consisting of water, pure water, deionized water, distilled water, ethanol, isopropanol, methanol, acetone, n-propanol and t-butanol, but is not limited thereto.

The binder solution may further include a thickener for making a stable solution by imparting viscosity. For example, the thickener may be used by mixing one or more of a cellulose-based compound, specifically, carboxymethyl cellulose, hydroxypropylmethyl cellulose, methyl cellulose, or alkali metal salts thereof. As the alkali metal, Na, K or Li may be used.

As the current collector, one selected from the group consisting of copper foil, nickel foil, stainless steel foil, titanium foil, nickel foam, copper foam, a polymer substrate coated with conductive metal, and combinations thereof may be used, but is not limited thereto.

(a2) Subsequently, the prepared binder solution is applied on the current collector.

The binder solution may be applied to have a thickness of 1 to 20 μm. More specifically, a coating thickness of the binder solution may be 1 to 5 μm. If the thickness of the applied binder solution is excessive, the binder solution may not be mixed easily with the electrode slurry, so that a separation between the layers may be apparent after drying, and a binder layer, which is an insulator, may be formed to increase interfacial resistance. Meanwhile, if the coating thickness of the binder solution is less than 1 μm, it may be difficult to achieve the intended purpose of the present invention. That is, in the aforementioned thickness range, the interfacial resistance may be reduced, interfacial adhesion between the current collector and the electrode active material layer may be improved, and process defects such as electrode detachment may be improved.

As a non-limiting example, any coating method known to be used for forming a film by generally applying a liquid phase may be used for the coating. For example, spray coating, dip coating, spin coating, gravure coating, slot die coating, doctor blade coating, roll coating, inkjet printing, lexography printing, screen printing, electrostatic hydrodynamic printing, micro contact printing, imprinting, reverse offset printing, bar-coating, gravure offset printing, etc. may be used, but are not limited thereto.

In step (b), a magnetic field is applied to the current collector to which the binder solution is applied.

The magnetic field may be a unidirectional magnetic field formed by magnetic devices positioned above and below the current collector. FIG. 1 is a view illustrating a change in array of solid particles in a binder solution when a magnetic field is applied according to an embodiment of the present invention. As can be seen in FIG. 1, when a magnetic field is applied, the solid particles in the binder solution may be arranged in a direction of the magnetic field by the magnetic particles to form a chain structure and have characteristics similar to those of a solid, thereby increasing the viscosity of the binder solution. Meanwhile, when the magnetic field is not applied, the solid particles in the binder solution return to their original fluid state, thereby lowering the viscosity of the binder solution to 500 cp or less, which is an initial state.

The strength of the magnetic field may be 100 to 5000 G, preferably, 500 to 3000 G, and, more preferably, 2000 to 3000 G, and a magnetic field application time may be 1 second to 60 seconds, preferably, 10 seconds to 60 seconds, more preferably, 30 seconds to 60 seconds. When the electrode slurry (upper part) is applied to the binder solution (lower part) applied on the current collector under the above conditions, the viscosity of the lower binder solution may be increased, so that the distribution of the solid content in the binder solution may be maintained uniformly even after the electrode slurry is applied to the upper part. Accordingly, a phenomenon in which the loading amount of the solid content at the center and the edge of the current collector is not maintained at the initial uniform state so the interfacial adhesion between the current collector and the electrode active material layer is reduced may be suppressed.

More specifically, the viscosity of the binder solution before and after the application of the magnetic field under the above conditions may satisfy Relational Expression 1 below.

$$1.2 < A_2/A_1 < 5 \qquad \text{[Relational Expression 1]}$$

In Relational Expression 1, $A_1$ is the viscosity of the binder solution before the magnetic field is applied, and $A_2$ is the viscosity of the binder solution when the electrode slurry is applied after the magnetic field is applied.

In Relational Expression 1, $A_1$ is the viscosity of the binder solution before the magnetic field is applied, and may be 500 cp or less, specifically, 100 to 500 cp, and $A_2$ is the viscosity of the binder solution when the electrode slurry is applied after the magnetic field is applied, specifically, may be the viscosity of the binder solution before a drying process.

More specifically, in Relational Expression 1, $2.0 < A_2/A_1 < 3.5$ or $2.2 < A_2/A_1 < 3$ may be satisfied.

By satisfying the above Relational Expression 1, a uniform distribution of the binders in the lower binder solution may be uniformly maintained, thereby improving adhesion, as well as problems such as the lower binder solution being pushed by a strong discharge pressure of the upper electrode slurry in a mass-production process.

In step (c), the electrode slurry including the electrode active material is applied on the binder solution.

The electrode active material may be an electrode active material typically used in secondary batteries. A negative electrode active material may be, for example, a carbon-based negative electrode active material, a silicone-based negative electrode active material, or a mixture thereof, but is not limited thereto. The carbon-based negative electrode active material may be one or more selected from the group consisting of artificial graphite, natural graphite, and hard carbon. The silicone-based negative electrode active material may be Si, $SiO_x(0<x<2)$, an Si-Q alloy (Q is an element selected from the group consisting of alkali metal, alkaline earth metal, group 13 element, group 14 element, group 15 element, group 16 element, transition metal, rare earth element, and combinations thereof, and not Si), a Si-carbon composite, or a mixture of at least one thereof and $SiO_2$. A positive electrode active material may be a composite oxide of lithium and a metal selected from among cobalt, manganese, nickel, and combinations thereof, but is not limited thereto.

The application of the electrode slurry is the same as the application of the binder solution described above, and any method known to be used for forming a known electrode slurry for a secondary battery may be used.

The method may further include step (d) of drying a result of step (c) after step (c).

Here, the drying may be performed at a temperature of 80 to 130° C., preferably, 100 to 130° C., for 10 to 50 minutes, preferably, 15 to 30 minutes. In this case, the viscosity of the binder solution applied on the current collector during drying may be 100 to 5000 cp, preferably, 200 to 2000 cp.

Subsequently, the dried electrode may be rolled to have an appropriate density to fabricate an electrode having the electrode active material layer formed on the current collector.

Figure 2:
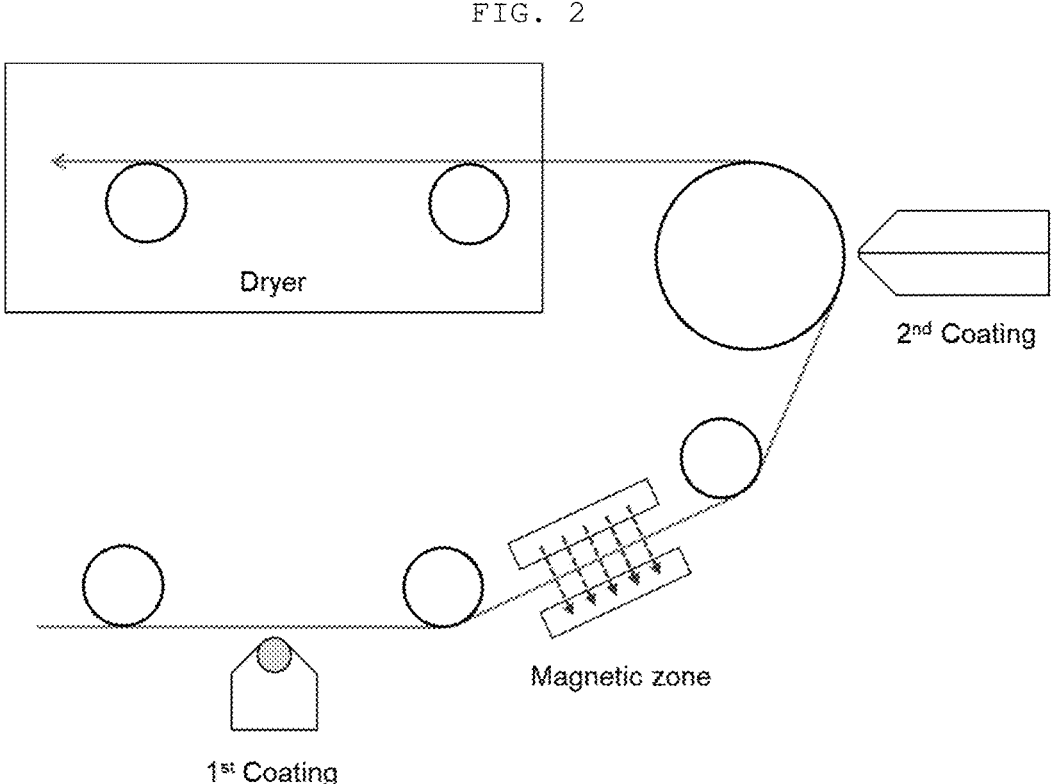
FIG. 2 is a diagram illustrating a process of fabricating a multi-layered electrode of a secondary battery according to an embodiment of the present invention.

FIG. 2 is a diagram illustrating a process of fabricating a multi-layered electrode of a secondary battery according to an embodiment of the present invention. As can be seen in FIG. 2, the method of fabricating a multi-layered electrode according to the present invention may include a primary coating step of applying a binder solution containing magnetic particles on a current collector; applying a magnetic field to the current collector to which the binder solution is applied; a secondary coating step of applying an electrode slurry on the first coated binder solution; and a drying step, which may be easily applied to a continuous process and a mass-production process.

The present invention also provides a multi-layered electrode including a current collector; and an electrode active material layer containing magnetic particles and a binder formed on the current collector, wherein a difference between maximum loading value and a minimum loading value of the electrode active material layer in at least five positions at regular intervals in a width direction is 10% or less of a total average loading value.

In this case, the loading may refer to a weight of the electrode active material layer finally formed after the binder solution and the electrode slurry applied on the electrode current collector are dried, and as a non-limiting example, a specimen may be obtained by punching at least five points at regular intervals in the width direction of the electrode, and the weight of the electrode active material layer of the specimen may be measured.

Therefore, the multi-layered electrode according to the present invention may have improved adhesion with respect to the current collector because the solid content is uniformly dispersed in the electrode active material layer.

The current collector, magnetic particles, binder, and electrode active material are the same as described above.

The multi-layered electrode according to an exemplary embodiment of the present invention may satisfy Relational Expression 2 below.

$$0.2 < B_2/B_1 < 0.8 \qquad \text{[Relational Expression 2]}$$

In Relational Expression 2, $B_1$ is the weight of the binder in the entire electrode active material layer, and $B_2$ is the weight of the binder in a region of 15% of a total thickness of the electrode active material layer from the current collector.

In Relational Expression 2, as for the $B_2/B_1$ binder weight ratio, in the case of using a styrene butadiene rubber (SBR)-based binder, a content (at %) to an Os element by adsorbing Os gas to the binder may be applied, but this is not limited to the Os element and an element that may indicate a corresponding binder according to types of binders may be used.

Specifically, $0.2 < B_2/B_1 < 0.6$, or $0.3 < B_2/B_1 < 0.6$.

Due to this, even if the binder content of the multi-layered electrode is significantly lowered, compared to the related art, to form the electrode active material layer, fairness/appearance defects such as interfacial detachment of the electrode may be improved and fast charging performance may be improved.

In the multi-layered electrode according to an embodiment of the present invention, the adhesion of the electrode active material layer with respect to the current collector may be 0.2N/cm or more, specifically, 0.2 to 1.0N/cm.

The multi-layered electrode may satisfy Relational Expression 3 below.

$$-30\% \leq (C-D)/D \leq +30\% \qquad \text{[Relational Expression 3]}$$

In Relational Expression 3, C is the interfacial adhesion between the current collector and the electrode active material layer measured at a certain position selected in the width direction of the electrode active material layer, and D is an average value of the interfacial adhesion between the current collector and the electrode active material layer.

Specifically $-25\% \leq (CD)/D \leq +25\%$, or $-20\% \leq (CD)/D \leq +20\%$, or $-15\% \leq (CD)/D \leq +15\%$, or $-10\% \leq (CD)/D \leq +10\%$. In Relational Expression 3, C may be measured at positions having a regular interval in the width direction of the electrode active material layer, for example, 0.1 to 0.5 mm, or 0.2 to 0.3 mm, for example 0.25 mm, but the present invention is limited thereto.

According to an embodiment, the multi-layered electrode may be a positive electrode.

In addition, the present invention may provide a secondary battery including the multi-layered electrode; a separator; and an electrolyte.

The multi-layered electrode may be a positive electrode or a negative electrode depending on a type of the electrode active material included in the electrode layer, and the electrode active material is as described above.

A separator is not particularly limited as long as it is a known separation membrane in the art. For example, the separator may be a material selected from among glass fiber, polyester, polyethylene, polypropylene, polytetrafluoroethylene, or a combination thereof, may be in the form of a non-woven fabric or a woven fabric, and may be selectively used in a single-layer or multi-layer structure.

The electrolyte includes a non-aqueous organic solvent and an electrolyte salt. The non-aqueous organic solvent may be ethylene carbonate (EC), propylene carbonate (PC), dimethyl carbonate (DMC), diethyl carbonate (DEC), ethylmethyl carbonate (EMC), 1,2-dimethoxyethane (DME), $\gamma$-butyrolactone (BL), tetrahydrofuran (THF), 1,3-dioxolane (DOL), diethyl ether (DEE), methyl formate (MF), methyl propionate (MP), sulfolane (S), dimethyl sulfoxide (DMSO), acetonitrile (AN), or a mixture thereof, but is not limited thereto. The electrolyte salt is a material that is dissolved in a non-aqueous organic solvent, serves as a source of electrolytic metal ions in a battery, enables a basic secondary battery operation, and promotes migration of electrolytic metal ions between a positive electrode and a negative electrode. As a non-limiting example, when the electrolytic metal is lithium, the electrolytic salt may be $LiPF_6$, $LiBF_4$, LiTFSI, $LiSbF_6$, $LiAsF_6$, $LiClO_4$, $LiCF_3SO_3$, $Li(CF_3SO_2)_2N$, $LiC_4F_9SO_3$, $LiSbF_6$, $LiAlO_4$, $LiAlCl_4$, LiN $(C_xF_{2x+1}SO_2)(C_yF_{2y+1}SO_2)$(here, x and y are natural numbers), LiCl, LiI or a mixture thereof, but is not limited thereto. In addition, as the electrolyte salt, a known material having a concentration suitable for a purpose may be used, and if necessary, the electrolyte salt may further include a known solvent or additive to improve charge/discharge characteristics, flame retardancy characteristics, and the like.

Hereinafter, the present invention will be described in detail with reference to Examples, but these are for describing the present invention in more detail, and the scope of the present invention is not limited by the Examples below.

Example 1

Step 1: Preparation of Binder Solution

A binder solution was prepared by mixing 10 wt % of Ni-coated CNT (Ni content: 3 wt %) and 20 wt % of SBR binder with water at room temperature. Here, viscosity of the prepared solid binder solution measured at a shear rate of 1 s$^{-1}$ using a rotational viscometer was 430 cp.

Meanwhile, the Ni-coated CNT was prepared by mixing Ni Oxide ($Ni(NO_3)_2 \cdot 6H_2O$) with CNT in a 3:1 weight ratio in distilled water under ultrasonic waves, drying the mixture at 100° C., and then heat-treating a dried mixture at 300° C.

Step 2: Preparation of Negative Electrode Slurry

A negative electrode slurry (solid content: 50 wt %) was prepared by mixing 95 wt % of artificial graphite, 1.2 wt % of CMC, and 0.5 wt % of SBR.

Step 3: Preparation of Negative Electrode

The binder solution prepared in step 1 was applied to have a thickness of 5 μm on one surface of a copper current collector (copper foil having a thickness of 8 μm) using a slot die coater. Next, by placing neodymium magnets on the upper and lower portions of the current collector, respectively, a unidirectional magnetic field was applied in a direction perpendicular to the current collector under the following conditions.

Magnetic field strength: 2000 G

Magnetic field application time: 30 seconds

Magnetic field application direction: from the bottom to the top of the current collector Next, the negative electrode slurry prepared in step 2 was applied to the top of the binder solution to have a thickness of 100 μm. Here, viscosity of the lower binder solution when applying the negative electrode slurry measured at a shear rate of 1 s$^{-1}$ using a rotational viscometer was 1100 cp. Hereinafter, one surface of the current collector to which the binder solution was applied is referred to as an upper part of the current collector, and the other surface of the current collector to which the binder solution was not applied is referred to as a lower part.

Immediately after applying the binder solution and the electrode slurry on the copper current collector, the copper current collector with the binder solution and the electrode slurry applied thereto was dried for 30 minutes in a drying furnace heated with hot air at 130° C. to fabricate a negative electrode having a final thickness of 105 μm.

Comparative Example 1

In Example 1, without applying a magnetic field to a current collector coated with a binder solution, the current collector coated with the binder solution was dried at 130° C. for 1 minute, a negative slurry was applied thereto, and then, the corresponding current collector was subjected to an additional process for 30 minutes to fabricate a negative electrode.

Comparative Example 2

A negative electrode was fabricated in the same manner as in Example 1, except that a negative electrode slurry was immediately applied without applying a magnetic field to a current collector to which the binder solution was applied.

Evaluation Example 1: Evaluation of Adhesion Between Negative Electrode Active Material Layer and Current Collector The negative electrodes prepared in Example 1 and Comparative Examples 1 and 2 were cut to be 18 mm wide/150 mm long, and 18 mm wide tape was attached to a foil layer of the negative electrode, and then adhered sufficiently with a roller having a load of 2 kg. A negative electrode active material layer was attached to one side of the tensile tester using double-sided tape. The tape attached to the foil was fastened to the opposite side of the tensile tester, the adhesion was measured, and results thereof are shown in Table 1 below. Here, the negative electrode active material layer refers to an active material layer finally formed after the binder solution and the negative electrode slurry applied on the current collector are dried.

TABLE 1

| | | | Viscosity of preliminary binder layer (cp) | | | |
| | Strength of magnetic field (G) | Magnetic field application time (Sec.) | Before applying magnetic field ($A_1$) | When negative electrode slurry is applied ($A_2$) | Viscosity ratio $A_2/A_1$ | Adhesion (N/cm) |
|---|---|---|---|---|---|---|
| Example 1 | 2000 | 30 seconds | 430 | 1100 | 2.6 | 0.7 |
| Comparative Example 1 | — | — | 430 | — | — | 0.7 |
| Comparative Example 2 | — | — | 430 | 430 | 1 | 0.2 |

In Table 1, $A_1$ is the viscosity of the binder solution before the magnetic field is applied, and $A_2$ is the viscosity of the binder solution when the negative electrode slurry is applied after the magnetic field is applied.

Referring to Table 1, in the case of Example 1 to which a magnetic field was applied, it can be seen that, when the negative electrode slurry is applied, since the viscosity of the binder solution located at the lower part was high, fluidity of the particles was reduced and a uniform distribution of the binder was maintained, so that the adhesion between the negative electrode active material layer and the current collector is increased.

Meanwhile, in the case of Comparative Example 2, it can be seen that, since the negative electrode slurry was applied on the upper part of the binder solution in a low viscosity state, the solid particles in the lower binder solution moved, and in particular, since a loading amount of the solid content on the center and the edge of the current collector was not maintained in the initial uniform state, and thus, adhesion was reduced.

Meanwhile, in the case of Comparative Example 1, since the negative electrode slurry was formed after the binder solution was dried, the phenomenon described above was suppressed, thus exhibiting adhesion similar to that of Example 1, but a drying facility was additionally required in the electrode fabricating process and there are space restrictions.

Evaluation Example 2: Evaluation of Dispersion Stability and Homogeneity of Negative Electrode Active Material Layer According to the Magnetic Field Application Condition

Example 2

A negative electrode was fabricated in the same manner as in Example 1, except that a magnetic field was applied from the top to the bottom of the current collector.

Examples 3 to 5

A negative electrode was fabricated in the same manner as in Example 1, except that the viscosity and magnetic field application conditions of the solid binder solution were set to those described in Table 2 below by varying the solid content during the preparation of the binder solution. Here, the solid content of Examples 3 to 5 was adjusted so that the viscosity of each binder solution was 400 to 500 cp.

Example 6

A negative electrode was prepared in the same manner as in Example 1, except that a neodymium magnet was placed only on a lower portion of the current collector and a magnetic field was applied in an upward direction of the current collector.

Figure 3:
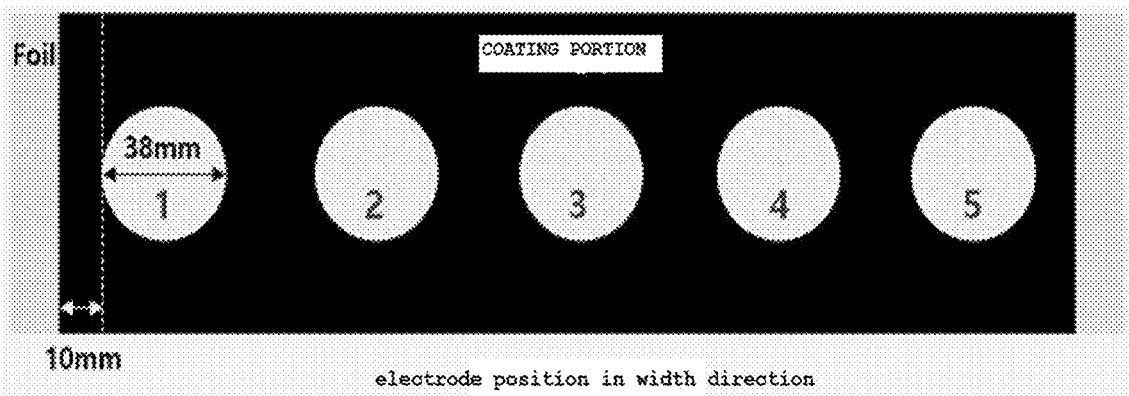
FIG. 3 is a schematic view of a specimen in which five points at regular intervals in a width direction of an electrode active material layer are selected and punched out in a circle having a diameter of 38 mm to evaluate homogeneity of the electrode active material layer.

Analysis of Homogeneity of Application of Negative Electrode Active Material Layer in Width Direction In order to analyze uniformity of application of the negative electrode active material layers prepared in Examples 1 to 6 and Comparative Example 2 in the width direction, as shown in FIG. 3, five points at regular intervals in the width direction of the negative electrode active material layer were selected and punched in a circular shape having a diameter of 38 mm. Thereafter, a weight (a loading amount of a negative electrode active material layer composition) of the negative electrode active material layer in the punched specimen was measured. Thereafter, a difference $(W_{max}-W_{min})/W*100$, %) between a maximum loading value $W_{max}$ and a minimum loading value $W_{min}$ of the negative electrode active material layer measured at the points, compared with an average loading value $W$ of the negative electrode active material layer at the five points, is shown in Table 2 below.

TABLE 2

| | | | Viscosity of lower binder solution (cp) | | | |
|---|---|---|---|---|---|---|
| | Strength of magnetic field (G) | Magnetic field application time (Sec.) | Before applying magnetic field ($A_1$) | When slurry is applied ($A_2$) | Viscosity ratio $A_2/A_1$ | $(W_{max} - W_{min})/W*100$, % |
| Example 1 | 2000 | 30 | 430 | 1100 | 2.6 | 1.2 |
| Example 2 | 2000 | 30 | 430 | 1100 | 2.6 | 1.2 |
| Example 3 | 500 | 30 | 400 | 710 | 1.5 | 3.8 |
| Example 4 | 2000 | 60 | 500 | 1200 | 2.4 | 1.5 |
| Example 5 | 3000 | 60 | 450 | 1270 | 2.8 | 1.4 |
| Example 6 | 2000 | 30 | 430 | 850 | 1.9 | 3.5 |
| Comparative Example 2 | — | — | 430 | 430 | 1 | 7.2 |

In Table 2, $A_1$ is the viscosity of the binder solution before the magnetic field was applied, and $A_2$ is the viscosity of the binder solution when the negative electrode slurry was applied after the magnetic field was applied.

Referring to Table 2, in the case of Examples 1 to 6 to which a magnetic field was applied, when the negative electrode slurry was applied, since the viscosity of the lower binder solution was high, movement of solid particles in the binder solution was suppressed, thereby improving the homogeneity.

Meanwhile, in the case of Comparative Example 2, as the negative electrode slurry was applied to the upper part in a state in which the viscosity of the lower binder solution was low, the distribution of solid particles in the lower binder solution was not maintained in an initial uniform state, and thus, the homogeneity was determined to be significantly reduced.

Specifically, as can be seen from the results of Examples 1 and 2, the homogeneity of the negative electrode active material layer was high with a similar value, regardless of the magnetic field application direction.

Meanwhile, when the magnetic device is located on only one side (lower part) of the current collector (Example 6), it is determined that the magnetic particles (or magnetic particles-solid particle aggregate) in the lower binder solution were attracted to one side (the lower part of the current collector) to cause a reduction in viscosity due to the reduction in distributed particles in the binder solution, thus exhibiting relatively low homogeneity, compared to Example 1.

In addition, from Examples 3 to 5, it can be seen that preferable strength of the magnetic field is 2000 to 3000 G, and the application time is 30 to 60 seconds.

Evaluation Example 3: Evaluation of Fast Charging Performance

A fast charging evaluation was performed to charge the secondary batteries prepared in Examples 1 to 3 and Comparative Example 2 at a C-rate of 2.5 C at a temperature of 25° C. and discharge the secondary batteries prepared in Examples 1 to 3 and Comparative Example 2 at a C-rate of 1/3 C. After repeating 100 cycles and 200 cycles, a fast charge capacity retention rate was measured, and results thereof are shown in Table 3 below.

TABLE 3

| | Fast charge capacity retention rate (%) | |
|---|---|---|
| | 100 cycle | 200 cycle |
| Example 1 | 87.8 | 84.6 |
| Example 2 | 86.5 | 83.9 |

TABLE 3-continued

| | Fast charge capacity retention rate (%) | |
| | --- | --- |
| | 100 cycle | 200 cycle |
| Example 3 | 82.6 | 76.5 |
| Comparative Example 2 | 80.1 | 71.2 |

Referring to Table 3, in the case of Examples 1 to 3 to which a magnetic field was applied, it can be seen that the homogeneity of the negative electrode active material layer and the adhesion between the negative electrode active material layer and the current collector were excellent, so that the fast charge capacity retention rate was improved.

Meanwhile, in the case of Comparative Example 2, since the negative electrode slurry was applied to the upper part in a state in which the viscosity of the lower binder solution was low, the homogeneity of the negative electrode active material layer and the adhesion between the negative electrode active material layer and the current collector were lowered and the capacity retention rate was significantly reduced as a charge/discharge cycle proceeded.

Meanwhile, in the case of Examples 1 and 2 satisfying the preferable strength of magnetic field (2000 to 3000 G) and magnetic field application time (30 to 60 seconds) of the present invention, it can be seen that the capacity retention rate was superior to that of Example 3.

The present invention may improve interfacial adhesion between the current collector and the electrode active material layer, improve fairness/appearance defects such as electrode detachment, and improve fast charging performance.

What is claimed is:

1. A fabrication method of a multi-layered electrode for a battery, the method comprising steps:
   (a) applying a binder solution including magnetic particles and a conductive material on a current collector;
   (b) applying a magnetic field to the current collector to which the binder solution is applied;
   (c) following step (b), applying an electrode slurry including an electrode active material on the binder solution; and (d) performing drying after step (c),
wherein the magnetic particles are directly coated on the conductive material,
wherein the magnetic field applied in step (b) is a unidirectional magnetic field formed by a magnetic device positioned above and below the current collector.

2. The method of claim 1, wherein a total content of solid content in the binder solution is 0.5 to 50 wt %.

3. The method of claim 1, wherein a viscosity of the binder solution in step (a) is 500 cp or less.

4. The method of claim 1, wherein a weight ratio of the magnetic particles and a binder in the binder solution is 1:20 to 1:80.

5. The method of claim 3, wherein a content of the magnetic particles in the binder solution is 0.1 to 5 wt % based on a total weight of the binder solution.

6. The method of claim 1, wherein the magnetic particles include at least one selected from the group consisting of iron (Fe), nickel (Ni), and cobalt (Co).

7. The method of claim 1, wherein a binder in the binder solution is a water-soluble binder.

8. The method of claim 1, wherein step (b) is applying a magnetic field in a direction perpendicular to the current collector.

9. The method of claim 1, wherein a strength of the magnetic field is 100 to 5000 G, and a magnetic field application time is 1 second to 60 seconds.

10. The method of claim 1, wherein
   a viscosity of the binder solution before and after the application of the magnetic field satisfies Relational Expression 1 below, $$1.2 < A_2/A_1 < 5 \qquad \text{[Relational Expression 1]}$$

wherein $A_1$ is a viscosity of the binder solution before the magnetic field is applied, and $A_2$ is a viscosity of the binder solution when the electrode slurry is applied after the magnetic field is applied.

11. The method of claim 1, wherein a viscosity of the binder solution during drying is 100 to 5000 cp.

\* \* \* \* \*